United States Patent
Bourdin et al.

(10) Patent No.: US 7,696,451 B2
(45) Date of Patent: Apr. 13, 2010

(54) LASER CUTTING METHOD

(75) Inventors: Dominique Bourdin, Chevannes (FR);
Jerome Margonty, Viry Chatillon (FR);
Thierry Sardou, Saint Maurice (FR)

(73) Assignee: Snecma, Paris (FR)

( * ) Notice: Subject to any disclaimer, the term of this patent is extended or adjusted under 35 U.S.C. 154(b) by 305 days.

(21) Appl. No.: 11/672,735

(22) Filed: Feb. 8, 2007

(65) Prior Publication Data

US 2007/0184705 A1 Aug. 9, 2007

(30) Foreign Application Priority Data

Feb. 9, 2006 (FR) .................................. 06 50460

(51) Int. Cl.
*B23K 26/38* (2006.01)

(52) U.S. Cl. .............................. 219/121.72; 219/121.71

(58) Field of Classification Search ............ 219/121.67, 219/121.7, 121.71, 121.72

See application file for complete search history.

(56) References Cited

U.S. PATENT DOCUMENTS

| 4,948,331 | A | | 8/1990 | Roy et al. | |
|---|---|---|---|---|---|
| 5,444,211 | A | * | 8/1995 | Nakata et al. | 219/121.67 |
| 5,667,708 | A | | 9/1997 | Glass et al. | |
| 5,994,667 | A | * | 11/1999 | Merdan et al. | 219/121.67 |
| 6,407,362 | B1 | * | 6/2002 | Schmid et al. | 219/121.71 |
| 6,693,256 | B2 | * | 2/2004 | Furujo et al. | 219/121.72 |

FOREIGN PATENT DOCUMENTS

| DE | 19908630 A1 | * | 8/2000 |
|---|---|---|---|
| FR | 2766116 A1 | * | 1/1999 |
| JP | 6-277862 A | * | 10/1994 |
| JP | 7-136792 | | 5/1995 |
| JP | 10-43880 | | 2/1998 |
| JP | 2005-177786 | | 7/2005 |

* cited by examiner

*Primary Examiner*—Geoffrey S Evans
(74) *Attorney, Agent, or Firm*—Oblon, Spivak, McClelland, Maier & Neustadt, L.L.P.

(57) ABSTRACT

A method for laser cutting at least a first aperture in a first metal plate in the presence of a second metal plate placed parallel to and a short distance from the first plate and having a second aperture, the outline of which is in line with the outline of the aperture to be cut, wherein a plate forming a protective device, of defined thickness and having a third aperture whose outline is inwardly offset with respect to the outline of the second aperture, is placed between the first and second plates.

8 Claims, 2 Drawing Sheets

LASER CUTTING METHOD

BACKGROUND OF THE INVENTION

The present invention relates to the field of cutting metal workpieces by means of a laser, for example a $CO_2$ laser.

DESCRIPTION OF THE PRIOR ART

To manufacture certain metal components of complex geometry using machining or cutting means, specific methods have to be developed. This is the case when manufacturing a driving fluid distribution casing meeting particular specifications in a turbomachine, such as a gas turbine engine.

The casing in question has a frustoconical general shape, on the internal face of which two coaxial shells are fastened, the diameters of the shells being slightly different. Openings are cut near the free edge of the outer shell on the one hand, and the inner shell on the other to allow stationary fluid distribution vanes to be fitted thereinto. These openings are aligned radially in pairs.

The problem that arises is how to cut the openings in the inner shell.

Several techniques have been envisioned, but they have drawbacks:
  the EDM method is, for example, lengthy and incurs a high manufacturing cost of the component. Furthermore, metallurgical problems arise that require necessary reconditioning;
  EDM wire cutting, owing to its space requirement, is not suited to the geometry of the component, and the duration incurs a high manufacturing cost;
  use of a water jet is tricky to implement insofar as the outer shell is liable to be damaged while the inner shell is being cut. Furthermore a lack of precision is observed; and
  punching is also difficult to implement owing to the closeness of the two shells.

The laser technique is advantageous owing to its precision and its cutting speed, but the problem that arises is how to prevent the outer shell from being damaged when the beam, having passed through the wall of the inner shell, is stopped by the wall of the outer shell. The outer shell is damaged both by the impacts of the laser beam and by the spattering of molten metal.

Positioning a simple protector, made of a metal resistant to the wavelength of the $CO_2$ beam, between the two shells is unsatisfactory as this does not prevent molten metal from being spattered back onto the rear surface of the inner shell.

The use of wax in this environment is not satisfactory either, since it rapidly passes from the solid state to the liquid state and is ejected by the gas that accompanies the laser, leaving the outer shell unprotected.

The Applicant was therefore set the objective of developing a cutting method that solves this problem.

SUMMARY OF THE INVENTION

According to the invention, the method for laser cutting at least a first aperture in a first metal plate in the presence of a second metal plate placed parallel to and a short distance from the first plate and having a second aperture, the outline of which is in line with the outline of the first aperture to be cut, is noteworthy in that a plate forming a protective means, of defined thickness and having a third aperture whose outline is inwardly offset with respect to the outline of the second aperture, is placed between the first and second plates.

Thanks to the invention, the back-spattering of molten metal is eliminated, since this metal is removed through the apertures in the protective plate and those in the second plate. Furthermore, the laser beam is stopped and its residual energy absorbed by the protector. A burr-free cut is also observed at the exit of the beam. This method also reduces the extent of the thermally affected zone which was determined to be less than 0.05 mm.

The process applies in particular to the cutting of a plate in an assembly, the first plate of which is made of a nickel-based alloy.

The problem arises especially when the distance between the first and second plates is less than 15 mm.

Preferably, the protective plate is made of an aluminum-based metal and its thickness is between 0.5 and 1.5 mm, for example 1 mm.

It has been found that, to achieve effective protection, in the case of apertures measuring about 30 mm in length by 2 mm in width, the offset between the outline of the third aperture in the protective plate with respect to the outline of the second aperture in the second plate must be less than 0.5 mm, preferably between 0.2 and 0.3 mm, for example 0.25 mm.

In the particular application envisaged, the first and second plates are, respectively, an inner shell and an outer shell that are mounted coaxially inside a turbomachine casing. More particularly, the apertures made in the shells form housings for distributor vanes.

BRIEF DESCRIPTION OF THE DRAWINGS

A nonlimiting embodiment of the method of the invention will now be described in greater detail with reference to the drawings in which.

DESCRIPTION OF THE PREFERRED EMBODIMENTS

Figure 1:
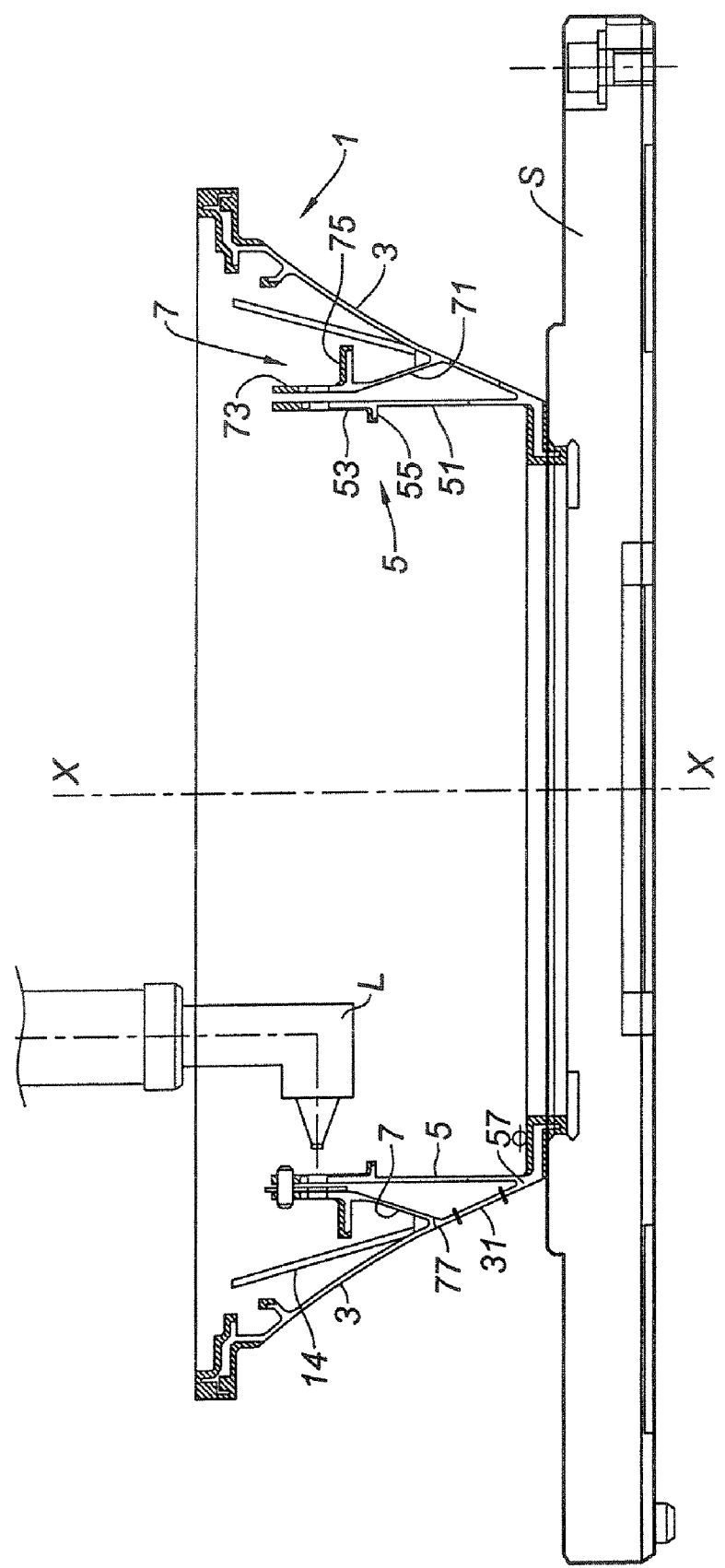
FIG. 1 shows a turbomachine distributor casing in axial section during cutting.

The invention applies to the fitting of the elements of a high-pressure distributor casing of a gas turbine engine. This is a stator member placed downstream of the combustion chamber of the engine, comprising an annular channel that receives the combustion gases from the combustion chamber and guides them so as to feed the high-pressure turbine wheel placed axially downstream of the stage with distributing vanes placed at its end. In FIG. 1, the casing 1 being manufactured is fixed to a support S so as to allow the various machining and assembly operations to be carried out.

The casing comprises a generally frustoconical part 3 of axis XX. The various elements that together form a stator component of the turbomachine are welded to or machined in said part 3. In particular, the casing comprises two coaxial shells 5 and 7 that leave between them an annular channel of axis XX for the combustion gases coming from the combustion chamber. The annular channel communicates on one side with orifices 31 cut into the wall of the frustoconical part 3. The channel is convergent over a certain length, between the portions 51 and 71 of the two shells, and then becomes cylindrical. The latter part is defined by two cylindrical portions 53 and 73. The two shells comprise transverse stiffeness 55 and 75, respectively. The free edges 53L and 73L of the two cylindrical portions 53 and 73 lie in one and the same plane perpendicular to the XX axis. An HP turbine wheel is placed on the engine facing the channel and said wheel receives the combustion gases, which are conveyed therethrough. Distributor vanes are mounted radially between the two cylindrical portions 53 and 73. These vanes are housed between the apertures made, in the two portions 53 and 73, and are aligned radially in pairs.

Figure 3:
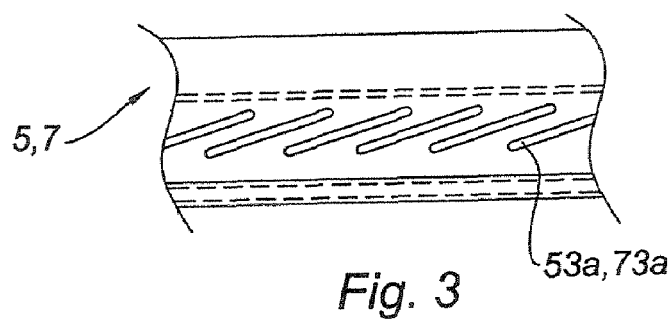
FIG. 3 shows, in plan, a partial view of plates with the apertures.

According to the application considered here, and as may be seen in FIG. 3, the respective apertures 53a and 73a have an approximately rectangular shape with long straight edges inclined to the XX axis and are joined by rounded edges.

The shells are welded to the internal face of the frustoconical part at 57 and 77 respectively.

Figure 2:
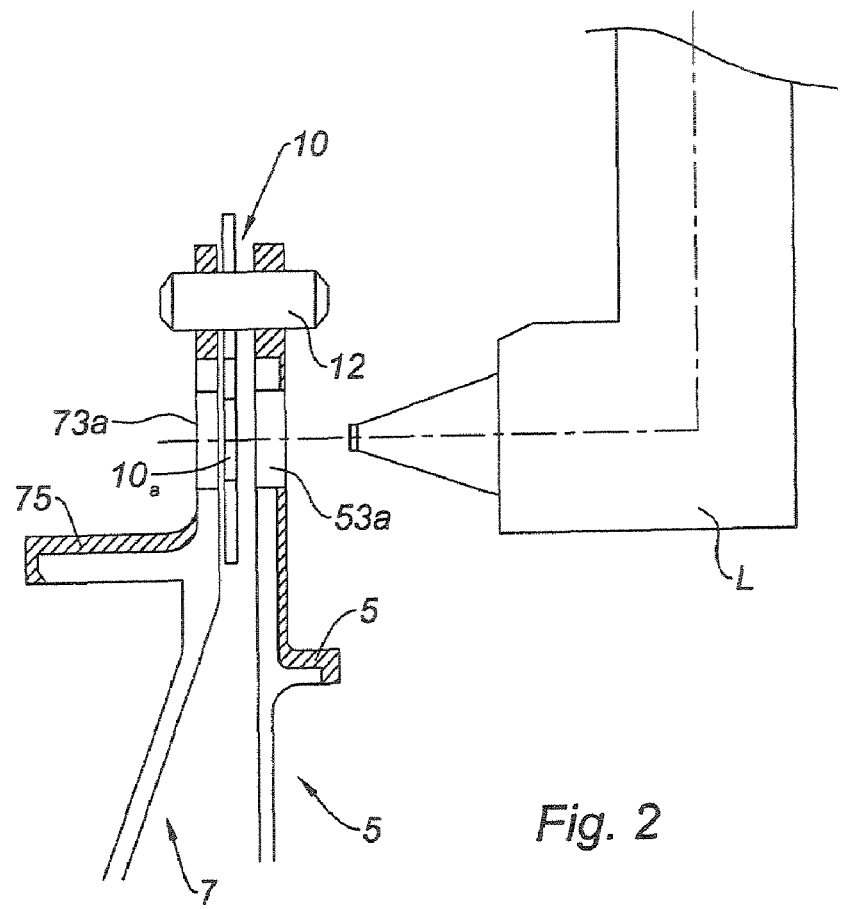
FIG. 2 shows part of FIG. 1 in detail.

The casing is assembled by the following steps. The outer shell 7 is first placed on the casing and welded thereto at 77. Next, the apertures 73a are cut according to the pattern shown in FIG. 3 by means of a laser cutting tool this here is a laser of the $CO_2$ type but other types may be suitable. The laser cutting head L is shown in FIGS. 1 and 2. This is supported and controlled by means (not shown) known per se. When this first operation has been completed, the shell 5 is placed on the casing and welded thereto along the line 57. The relative position of the two shells is determined according to the considerations associated with manufacture of the engine, these being defined moreover.

For the applications envisaged, the difference in radius between the two shells at 53 and 73 is less than 15 mm and in practice it is around 4 to 5 mm. To cut the apertures 53a, the cutting head L is operated in the same manner.

Because of the small gap between the two shells, the problems mentioned above are encountered. The geometrical constraints—the molten metal spattered by the cutting gas does not have time to cool down, the beam does not have enough space to diverge and lose energy density—the metallurgical constraints and the constraints associated with the grade/state/thickness of the material to be cut dictate the use of a focusing lens (7.5 inches) with a focal point located at the material exit, hence a high energy density is maintained, with insufficient divergence of the beam, and generation of laser beam melting impacts in the absence of any protection.

According to the invention, a protective means 10 is placed between the two shells 5 and 7. This means is in the form of a shell or in the form of a plate, depending on whether the elements 5 and 7 are shells or plates.

In the present example, the difference in diameter between the two shells is 4.1 mm. The protective means 10 has a thickness of 1 mm and is placed at a distance of 2.6 mm behind the first shell.

Figure 4:
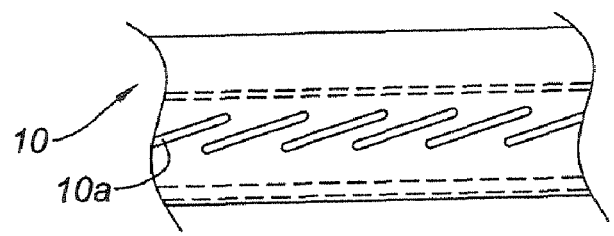
FIG. 4 shows a partial plan view of the protective plate.

The function of this protective means 10 is to absorb the residual energy of the beam as it leaves the cut in the inner shell, so as to protect the apertures in the outer shell 7 and also to prevent any back-spattering of molten metal on the inner shell. This result is achieved by providing apertures 10a that are aligned with the apertures 73a, existing at the time of cutting, and the apertures 53a to be cut. These apertures 10a, which may be seen in FIG. 4, are distinguished therefrom by the fact that they are slightly smaller than the apertures 53a and 73a, which may be seen in FIG. 3. Thus, their outlines are inwardly offset with respect to the outlines of the apertures 73a and mask them. For example, for apertures 53a and 73a measuring 27.9 mm in length by 2 mm in width, apertures measuring 27.4 mm in length by 1.5 mm in width are made in the protective means. The outline of each aperture in the protective means is offset by 0.25 mm±0.05 mm.

The protective means is held in place between the two shells by pins 12, for example, three pins distributed at 120° in the case of shells.

The method allows molten metal to be removed through the apertures 10a in the protective means 10, passing via the apertures 73a in the outer shell 7. A protective screen 14 is placed behind the second shell in order to protect the casing.

After cutting, no laser beam impacts are observed. The profile of the apertures in the protective means allows the apertures in the outer shell to be protected (no deposition of molten metal on the edge or in a trace of beam melting) and allows the residual energy associated with the beam to be absorbed. Moreover, the metallurgical specifications are met. The heat-affected zone is less than 0.05 mm, and no burrs are visible.

The invention claimed is:

1. A method for cutting a workpiece, said method comprising:
    a step of laser cutting at least a first aperture in a first metal plate in the presence of a second metal plate placed parallel to and a short distance from the first plate and having a second aperture, the outline of which is in line with the outline of the first aperture to be cut, wherein a third plate forming a protective device, of defined thickness and having a third aperture whose outline is inwardly offset with respect to the outline of the second aperture, is present between the first and second plates during laser cutting.

2. The method as claimed in the preceding claim, wherein the first plate is made of a nickel-based alloy.

3. The method as claimed in claim 1 or 2, wherein the distance between the first and second plates is less than 15 mm.

4. The method as claimed in claim 1, wherein the third plate forming a protective device is made of an aluminum-based alloy with a thickness between 0.5 and 1.5 mm.

5. The method as claimed in claim 1, wherein the offset between the outline of the third aperture in the protective device relative to the outline of the second aperture in the second plate is less than 0.5 mm.

6. The method as claimed in claim 5, wherein the offset is between 0.2 and 0.3 mm.

7. The method as claimed in claim 1, wherein the first and second plates are, respectively, an inner shell and an outer shell that are mounted coaxially inside a turbomachine casing.

8. The method as claimed in claim 7, wherein the apertures made in the shells form housings for distributor vanes.

* * * * *